United States Patent
Kadnichansky et al.

(10) Patent No.: US 8,153,749 B2
(45) Date of Patent: Apr. 10, 2012

(54) ABSORBENT AND A METHOD OF PRODUCTION THEREOF

(75) Inventors: Emil Gennadyevich Kadnichansky, g. Moscow (RU); Sergey Valentinovich Badaev, g. Moscow (RU); Vasily Georgievich Khramov, Moskovskaya obl. (RU)

(73) Assignee: Obshchestvo s Ogranichennoy Otvetstennostyu "Esfarm", Moscow (RU)

( * ) Notice: Subject to any disclaimer, the term of this patent is extended or adjusted under 35 U.S.C. 154(b) by 136 days.

(21) Appl. No.: 12/449,428

(22) PCT Filed: Feb. 9, 2007

(86) PCT No.: PCT/RU2007/000066
§ 371 (c)(1),
(2), (4) Date: Aug. 7, 2009

(87) PCT Pub. No.: WO2009/022931
PCT Pub. Date: Feb. 19, 2009

(65) Prior Publication Data
US 2011/0003960 A1 Jan. 6, 2011

(51) Int. Cl.
*C08G 77/16* (2006.01)
(52) U.S. Cl. .......................................................... 528/33
(58) Field of Classification Search ....................... 528/33
See application file for complete search history.

(56) References Cited

U.S. PATENT DOCUMENTS

| | | | | |
|---|---|---|---|---|
| 4,377,675 A * | 3/1983 | Daudt et al. | ..................... | 528/25 |
| 4,661,551 A * | 4/1987 | Mayer et al. | .................. | 524/379 |
| 5,198,518 A * | 3/1993 | Yamamoto et al. | ............. | 528/12 |
| 2008/0083672 A1 * | 4/2008 | Dong et al. | ................... | 210/660 |

FOREIGN PATENT DOCUMENTS

| | | |
|---|---|---|
| JP | 60-041476 | 3/1985 |
| RU | 2 111 979 | 5/1998 |
| SU | 168271 | 11/1965 |

OTHER PUBLICATIONS

International Search Report, Oct. 2007.
Vidal, Medicines in Russia 2000, M.: OVPEE—Astra Farm Service, C. E-8. (Spec, p. 1) (With English translation of the relevant parts).

* cited by examiner

*Primary Examiner* — Robert Loewe
(74) *Attorney, Agent, or Firm* — Collard & Roe, P.C.

(57) ABSTRACT

Synthesis is for an organosilicic adsorbent, which can be used in different economic sectors (chemical and pharmaceutical industries, health service). The adsorbent represents the non-linear reaction product of polycondensation, a polyhydrate of 1,1,3,3-tetrahydroxy-1,3-dimethyldisiloxane having from 88 to 89 moles of water per one mole of 1,1,3,3-tetrahydroxy-1, 3-dimethyldisiloxane.

The adsorbent is produced by means of mixing 19-20 parts of alkaline solution of sodium dioximethylsiliconate (DOMS) with a density of 1.16-1.19 g/cm$^3$ with 6 parts of sulfuric acid with a density of 1.195-1.205 g/cm$^3$ at a temperature of between 0-5° C. followed by aging of the mixture, followed by addition of water, followed by mixing, followed by breaking up of the solid product resulting in a suspension, followed by the addition of more water to the suspension, then allowing the suspension to settle, followed by removal of the supernatant via decantation, followed by repetition of the settling and decanting steps until the DOMS is removed completely, whereupon the final product is washed with a solution of sulphuric acid until water wash has a pH of 4.0, then the final product is washed with purified water until water wash has a pH of 5.0-7.0 followed by drying.

2 Claims, 2 Drawing Sheets

ABSORBENT AND A METHOD OF PRODUCTION THEREOF

CROSS-REFERENCE TO RELATED APPLICATIONS

This application is the National Stage of PCT/RU2007/000066 filed on Feb. 9, 2007. The international application under PCT article 21(2) was not published in English.

FIELD OF INVENTION

The invention is related to the area of organosilicic adsorbents, especially non-linear product of polycondensation, polyhydrate of 1,1,3,3-tetrahydroxy-1,3-dimethyldisiloxane (hereinafter referred to as TMPH), that can be used as an adsorbent in different economic sectors, including chemical and pharmaceutical industries as well as health service for adsorbing different substances, generally in various kind of pathologies in gastrointestinal tract for internal and external use.

BACKGROUND OF INVENTION

There is well known activated charcoal adsorbent (Reference book VIDAL. Medicines in Russia 2000.—M.: OVPEE—Astra Farm Service, C. E-8), used in chemical, food and pharmaceutical industries, such as in medicine. However, it suffers from grave shortcomings: small sorption activity and low adsorption selectivity, for instance in cholesterol, bilirubin, urea, uric acid that are generally discharged from the body by eliminative organs. Its use may be accompanied by constipation, diarrhea, and if it is used for a long time, hypovitaminosis and nutritive malabsorption are not rare. Activated charcoal is contraindicated in ulcerous lesions of the gastrointestinal tract and stomachal bleedings.

Most similar to the invention by its technical matter and acquired results are hydrogels of silicic acid and their production method (hereinafter referred to as HGSA) according to the Patent of Russian Federation 2111979, their chemical formula is the following: $\{(CH_3SiO_{1.5}) \cdot nH_2O\} \cdot \infty$, where $n=44-49$. HGSA are synthesized by polycondensation of sodium (or potassium) methylsiliconate solution in concentration from 1.75 to 2.30 mole per liter adding to it some strong acid solution (e.g. HCl or $H_2SO_4$) until hydrogel is formed, then after maturing it for 30-90 minutes, it is minced and after that activated by diluted solution of strong acid in concentration from 0.04 to 0.15 g·eq/l with its following cleaning by water until its reaction becomes neutral.

The above-mentioned method of HGSA production and their properties cannot be admissible because it does not reveal distinctive quantity of sodium (or potassium) methylsiliconate and strong acid required for its realization, that makes this method irreproducible, and, according to it, it is impossible to determinate physicochemical characteristics of the final product by such parameters as:
  appearance;
  dissolubility;
  pH;
  silica test;
  humidity (solid residual).

We also must consider as an imperfection of above mentioned method of HGSA production, the fact of that according to the examples 1-9, this production is realized applying reaction mixture in the temperature range of +10 to 35° C. However, as we could examine, the final product reaction does not take place, and some gel-like amorphous mass is derived, which cannot be separated from its water layer by decantation.

The explanation laid down in the mentioned patent stating that "the temperature required for the process of polycondensation must be from +10° C. to +35° C. (with the temperature lower than +10° C. gelation slows down greatly and in these conditions we cannot get any marked increase of the activity of derive substances, but at the temperature more than +35° C. the process accelerates so much that hydrogels' activation is practically leveled in its results)", does not correspond to the facts, because, according to our experimental observations, the most favourable temperature conditions which can secure maximum output of the claimed adsorbent, must be from 0° C. to +5° C.

Also we can refer to the deficiencies of this adsorbent the fact that the adsorbent HGSA with the empirical formula specified in the Patent No. 2111979 of Russian Federation, cannot be derived by the method explained in the present patent. So, having executed the synthesis according to the method outlined in the Patent No. 2111979 of Russian Federation, we can prove, that during the interaction of sodium methylsiliconate with sulfuric acid, there is generated a polycondensation product containing hydroxyl groups $\{(CH_3)_2Si_2O(OH)k\} \cdot nH_2O$, where k cannot be defined.

Hereby, the Patent No. 2111979 of Russian Federation of "Hydrogels of Silicic Acid as Adsorbents for Metabolites of Average Molecular Weight and the Method of their Production" practically describes the synthesis which produces as a result a compound that does not correspond to the stated formula $\{(CH_3SiO_{1.5}) \cdot n H_2O\} \infty$, where $n=44-49$.

We must also name between the defects of this prototype method the fact that, as our experiments have shown, the output of the final product is actually no more than 36.7%, when its adsorbing activity is nothing more than 2.5 micromole/g, whereas these indices, according to the claimed technical derivation, must be 96±1% and 4.9±0.7 micromole/g, respectively.

In this context, there we can see necessity to derive new adsorbents, which would increase their adsorbing activity, minimize labour expenditures, extend the output of the final product and reduce costs of manufacture.

SUMMARY OF THE INVENTION

As the technical result of the present invention we can state the following: increase of adsorbing activity of the sorbent, precise definition and simplification of the manufacturing process, extension of the output of the final product and minimization of labour expenditures. The above mentioned features are achieved by derivation and application of the nonlinear product of polycondensation, a polyhydrate of 1,1,3,3-tetrahydroxy-1,3-dimethyldisiloxane, having from 88 to 98 moles of water per one mole of 1,1,3,3-tetrahydroxy-1,3-dimethyldisiloxane. Its adsorbing activity to the colorant Congo red is 4.9±0.7 micromole/g.

The essence of its production method consists in the interaction of the chemical feedstock-alkaline solution of sodium dioximethylsiliconate with density of 1.16-1.19 g/cm³ (20 parts) with sulfuric acid (specific weight of 1.195-1.205 g/cm³) (6 parts), refrigerated at 0–+5° C. and stirred during 90 minutes.

The chemical scheme of the reaction is following:

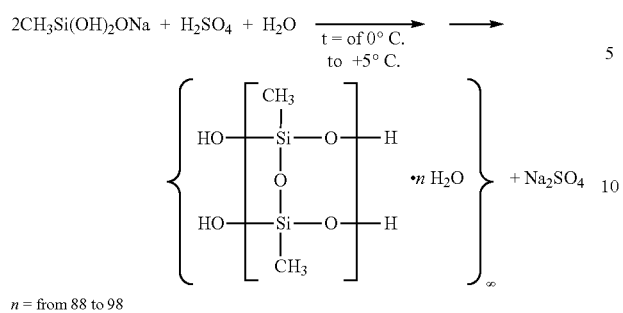

$2CH_3Si(OH)_2ONa + H_2SO_4 + H_2O \xrightarrow[\text{to } +5° C.]{t = \text{of } 0° C.}$ $\left\{ \begin{bmatrix} CH_3 \\ HO—Si—O—H \\ O \\ HO—Si—O—H \\ CH_3 \end{bmatrix} \cdot n\, H_2O \right\}_\infty + Na_2SO_4$ $n$ = from 88 to 98

When the reaction has completed and the final product has matured, the received mixture is flooded with 20 parts of water and blended manually through a sieve with a cell of 10 mm. After it is blended, the reactor is filled with water to 50 parts, everything is stirred and left for settling during 30 minutes. After the final product is settled to the bottom, supernatant fluid is removed. This procedure is repeated for no less than 2 times (to remove redundant sodium dioximethylsiliconate). After the phase of decantation, in the pores of the final product there is some sodium dioximethylsiliconate, that is removed by washing at the room-temperature with solution of sulphuric acid (specific weight of 1.001) until water wash has a pH of 4.0, and then with purified water until water wash gets a pH of 5.0-7.0.

BRIEF DESCRIPTION OF THE DRAWINGS

The present invention will now be described by reference to the drawings which are not to be deemed limitative of the present invention in any manner thereof, in which.

DETAILED DESCRIPTION OF PREFERRED EMBODIMENTS

Figure 1:
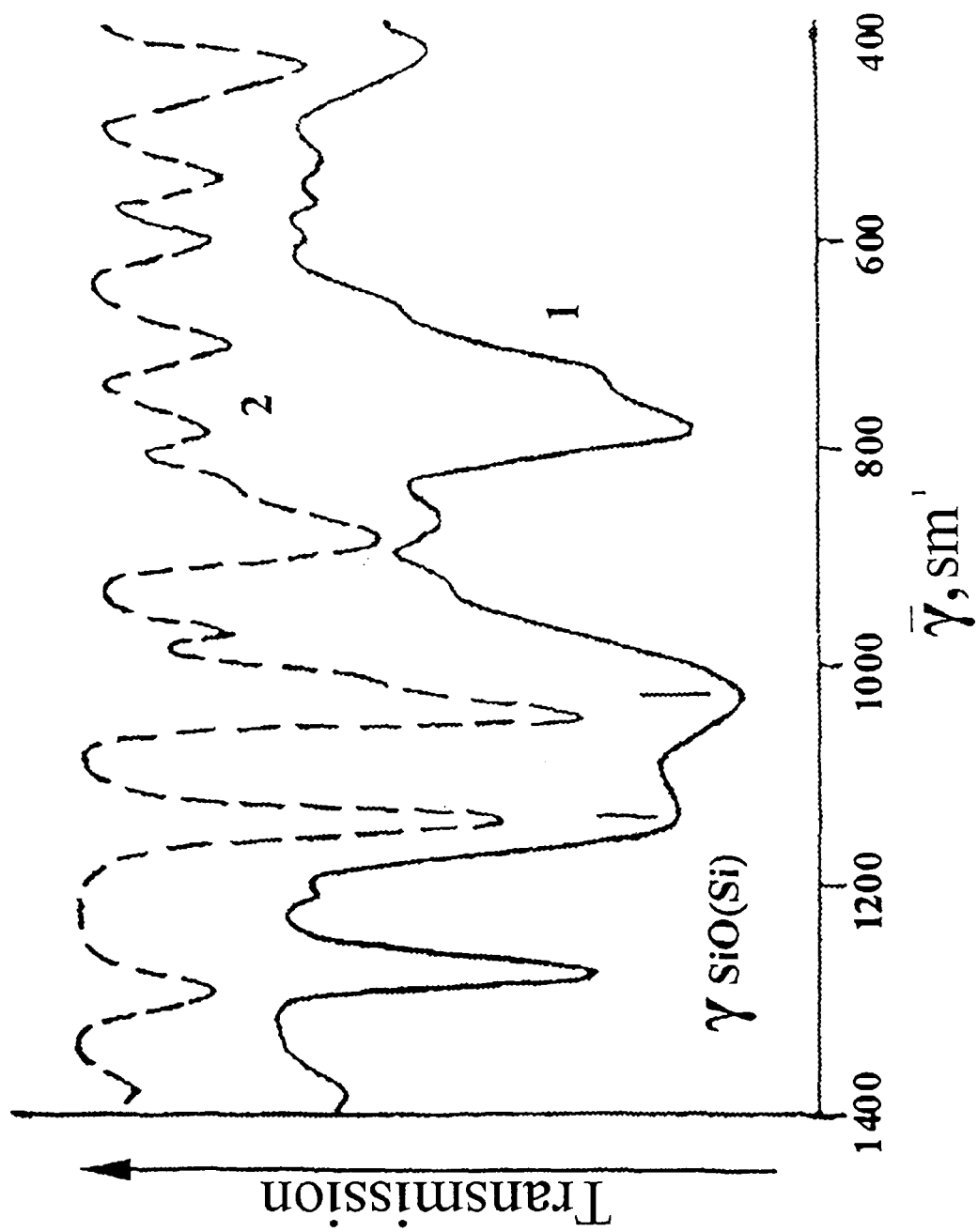
FIG. 1 shows calculated and experimental infrared spectrums of desiccated hydrogels in 400-1400 cm$^{-1}$ frequencies zone, where valence vibrations of groups Si—O(Si) are registered.

Below are examples of synthesis of the final product.

Example 1

To 234 g of alkaline solution of sodium dioximethylsiliconate with density of 1.17 g/cm$^3$ were added 72 g of sulfuric acid with density 1.200 g/cm$^3$ at the temperature of the reaction mixture of +5° C. and stirred during 90 minutes. After that were added to the received mixture 200 ml of water and manually blended the freshly settled gel. Then the reactor was refilled with water to 500 ml, everything blended and left to settle during 30 minutes. The supernatant fluid was removed by decantation. Such washing was repeated no less than 2 times until water wash had a pH from 5.0 to 7.0.

The achieved product had a gel-like form of almost white colour; it was indissoluble in water and organic solvents; it had a pH of 5.5; solid residual, defined by weighing method, formed 10.7%; it contained 4.55% of silicon; and its adsorbing activity was of 5.4 micromole/g.

Example 2

To 48 g of alkaline solution of sodium dioximethylsiliconate with density of 1.19 g/cm$^3$ were added 15 g of sulfuric acid with density 1.195 g/cm$^3$ at the temperature of the reaction mixture of +2° C. and stirred during 90 minutes. After that were added to the received mixture 30 ml of water and manually blended the freshly settled gel. Then the reactor was refilled with water to 100 ml, everything blended and left to settle during 30 minutes. The supernatant fluid was removed by decantation. Such washing was repeated no less than 2 times until water wash had a pH from 5.0 to 7.0.

The achieved product represented a gel of white colour; it was indissoluble in water and organic solvents; it had a pH of 6.6; solid residual formed 8.9%; it contained 3.56% of silicon; and its adsorbing activity was of 4.9 micromole/g.

Example 3

To 72 g of alkaline solution of sodium dioximethylsiliconate with density of 1.19 g/cm$^3$ were added 23 g of sulfuric acid with density 1.198 g/cm$^3$ at the temperature of the reaction mixture of 0° C. and stirred during 90 minutes. After that were added to the received mixture 40 ml of water and manually blended the freshly settled gel. Then the reactor was refilled with water to 150 ml, everything blended and left to settle during 30 minutes. The supernatant fluid was removed by decantation. Such washing was repeated no less than 2 times until water wash had a pH from 5.0 to 7.0.

The achieved product has a gel-like form of almost white colour; it was indissoluble in water and organic solvents; it had a pH of 6.3; solid residual formed 8.9%; it contained 3.90% of silicon; and its adsorbing activity was of 5.1 micromole/g.

The mentioned synthesized compound was analyzed to contain water, silicon, carbon and hydrogen. Water was defined after the vacuum dehydration of analyzed samples in the temperature range of 100-120° C.; silicon was defined by weighing method recalculating its content out of silicon oxide (SiO$_2$), carbon and hydrogen were detected in the CHN-analyzer of "Carlo-Erba" (Italy). Adsorbing activity of the received preparations (A) was evaluated by their capacity to adsorb the colorants Congo red and Methyl orange out of their water solution. According to the performed experiments, as a result of synthesis the final product was derived with the following physical-chemical properties, represented in Table 1.

TABLE 1

| Indices | Method | Norms |
| --- | --- | --- |
| Solubility | State pharmacopoeia, edition XI (SP XI) | Practically indissoluble in water and organic solvents |
| pH | Potentiometric measurements, SP ed. XI | 5.0-7.0 |
| Solid residual | Weighing | From 7.5 to 11.0% |
| Silicon | Gravimetric | From 2.90 to 4.60% |
| Adsorbing activity | Spectrophotometric method | 4.9 ± 0.7 micromole/g |

Solid residual was defined after the dehydration of 10 g of the product (exact mass) at the constant temperature from 120 to 125° C.

Silicon was defined after placing approximately 0.1 g (exact mass) of preliminary exsiccated to constant mass preparation into a preheated crucible. Then we added to it 0.5 ml of 95% ethanol and instilled by drops 1 ml of concentrated sulphuric acid. The mix was slowly heated in boiling bain-marie, periodically stirring until it became of dark brown colour.

The mixture was chilled and some concentrated nitric acid was added to it by drops until reddish black gas appeared and the mixture discoloured. Then the mix was steamed in bain-marie until "moist" residual appeared. If during the steaming the mixture darkened again, it was chilled, and some more concentrated nitric acid was added by drops and the mixture was steamed once more under the same conditions.

Received white residual was quantitatively transferred by means of hot water to a paper filter "blue tape". The filter with the residual was washed with hot water till its reaction to sulphates was negative. The washed filter with the residual was placed into the same crucible, dried and burnt. Then the residual was calcined in a muffle at the temperature of 1000° C. during 2 hours.

The content of silicon ($X_1$, %) was defined according to a formula:

$$X_1 = \frac{0{,}467 \cdot a \cdot m_1}{m}$$

m—band-and-hook hinge of the solid residual, taken for the analysis, g;
$m_1$—mass of the residual after its calcining, g;
a—content of the solid residual in the preparation (%), defined in the section "solid residual";
0.467—recalculation coefficient, numerically equal to the relation of the atomic mass of silicon to the molecular mass of silicon dioxide.

The adsorbing activity was evaluated by all of the following methods:

1. Approximately 1.0 g (precise band-and-hook hinge) of pounded with pestle preparation was placed into a conic glass-stoppered flask with volume capacity of 100 ml and to it 50.0 ml of Congo red solution (solution K.) was added to it. The mixture was shaken during 1 hour in a shaking apparatus, and then it was centrifuged during 30 minutes with rotational frequency of 6000 revolutions per minute. 2 ml of supernatant fluid were placed into a measuring flask with volume capacity of 50 ml, then the volume was filled with sodium chloride solution 0.02 M to the mark and mixed.

Optical density of the received solution was evaluated with a spectrophotometer in its maximum absorption with a wave length of 489 nm in a cuvette with layer thickness of 10 mm, using as a comparison 0.02 M sodium chloride solution.

Simultaneously there was evaluated the optical density $D_0$ of the stock solution of Congo red (solution $K_1$).

Adsorbing activity (A) of the preparation was calculated in micromoles per gram according to the formula:

$$A = \frac{(D_0 - D) \cdot m_0 \cdot 2 \cdot 50 \cdot 50 \cdot 1000000}{D_0 \cdot m \cdot 1000 \cdot 50 \cdot 2 \cdot M} = \frac{(D_0 - D) \cdot m_0 \cdot 50000}{D_0 \cdot m \cdot M}$$

$D_0$—optical density of the stock solution of Congo red (solution $K_1$);
D—optical density of the solution of Congo red after contacting with the preparation;
$m_0$—band-and-hook hinge of Congo red, g;
m—band-and-hook hinge of the preparation, g;
1000, 50—dilutions, ml;
M—molecular weight of Congo red (696.7).

Solution of Congo red was prepared by the following procedure:

Approximately 0.381 g (exact mass) of Congo red (Specification 6-09-07-634-76) was placed into a measuring flask with volume capacity of 1000 ml and diluted with 500 ml of 0.02 M sodium chloride solution, then solution's volume was filled to the mark with the same solution and mixed. 2 ml of achieved solution were placed into a measuring flask with volume capacity of 50 ml, then the flask's volume was filled to the mark with the 0.02 M sodium chloride solution and mixed.

2. Approximately 1.0 g (precise band-and-hook hinge) of pounded with pestle preparation was placed into a conic glass-stoppered flask with volume capacity of 100 ml and 50.0 ml of Methyl orange solution (solution M.) was added to it. The mixture was shaken vigorously during 1 hour in a shaking apparatus, and then it was centrifuged during 30 minutes with rotational frequency of 6000 revolutions per minute. 5 ml of supernatant fluid were placed into a measuring flask with volume capacity of 100 ml, then the volume was filled with sodium chloride solution 0.02 M to the mark and mixed.

Optical density of the received solution was evaluated with a spectrophotometer in its maximum absorption with a wave length of 464 nm in a cuvette with layer thickness of 10 mm, using as a comparison 0.02 M sodium chloride solution.

Simultaneously there was evaluated the optical density $D_0$ of the stock solution of Methyl orange (solution $M_1$).

Adsorbing activity (A) of the preparation was calculated in micromoles per gram according to the formula:

$$A = \frac{(D_0 - D) \cdot m_0 \cdot 5 \cdot 50 \cdot 100 \cdot 1000000}{D_0 \cdot m \cdot 1000 \cdot 100 \cdot 5 \cdot M} = \frac{(D_0 - D) \cdot m_0 \cdot 50000}{D_0 \cdot m \cdot M}$$

$D_0$—optical density of the stock solution of Methyl orange (solution $M_1$);
D—optical density of the solution of Methyl orange after contacting with the preparation;
$m_0$—band-and-hook hinge of Methyl orange, g;
m—band-and-hook hinge of the preparation, g;
1000, 50—dilutions, ml;
M—molecular weight of Methyl orange (327.0).

Solution of Methyl orange was prepared by the following procedure:

Approximately 0.180 g (exact mass) of Methyl orange (State Standard 10816-64) was placed into a measuring flask with volume capacity of 1000 ml and diluted hot in bain-marie with 500 ml of 0.02 M sodium chloride solution, then solution's volume was filled to the mark with the same solution and mixed. 5 ml of achieved solution were placed into a measuring flask with volume capacity of 100 ml, then the flask's volume was filled to the mark with the 0.02 M sodium chloride solution and mixed.

0.02 M sodium chloride solution in both cases was prepared by the following procedure. 1.170 g of sodium chloride (Pharmacopoeial Clause 42-2572-95) were placed into a measuring flask with volume capacity of 1000 ml and diluted with 50 ml of water, then solution's volume was filled to the mark with water and mixed. The water taken for this solution must have a pH from 6.0 to 6.5. Its pH was amended by 0.01 M sodium hydroxide solution or 0.01 M hydrochloric acid solution.

According the experiments' results, the received compounds overcome approximately 2 times by their adsorbing activity adsorbents HGSA as the nearest analog.

Besides a convincing evidence of high adsorbing activity there were determined indices of the optimal correlation synthesizing alkaline solution of sodium dioximethylsiliconate (DOMS) with sulfuric acid, as well as the optimum temperature of this synthesis.

To prove the optimal correlation of DOMS solution with $H_2SO_4$ the synthesis was carried out in the temperature range of 0° C. to +5° C. in different combinations, which are represented in Table 2.

TABLE 2

Output of the final product depending on correlation of primary reagents

| No. of experiment | Correlation of DOMS and sulfuric acid solutions | Output of final product, % | Remarks |
|---|---|---|---|
| 1 | 2 | 3 | 4 |
| 1 | 10:6 | 61 ± 2 | |
| 2 | 10:5 | 75 ± 3 | |
| 3 | 10:4 | 82 ± 4 | |
| 4 | 10:3 | 96 ± 1 | |
| 5 | 4:10 | 80 ± 4 | |
| 6 | 5:10 | 71 ± 3 | |
| 7 | 6:10 | 65 ± 3 | |

As follows from Table 2, the optimal correlation of DOMS and $H_2SO_4$ solutions is of 10:3 (20:6). In this case the output of the final product is of 96±1%, and it almost 2.5 times the nearest analog production.

Moreover, we have determined the fundamental optimum temperature value of the reaction mixture during the synthesis, as we can see in Table 3.

TABLE 3

Influence of synthesis temperature on the appearance of the final product and its output

| No. of experiment | Temperature value in the synthesis of the final product, °C. | Output of the final product, % | Properties of the final product |
|---|---|---|---|
| 1 | 2 | 3 | 4 |
| 1 | 40 | — | the product does not have any form |
| 2 | 35 | — | -<<- |
| 3 | 30 | 59 ± 4 | an amorphous fluid mass |
| 4 | 25 | 60 ± 3 | -<<- |
| 5 | 20 | 66 ± 2 | -<<- |
| 6 | 15 | 72 ± 3 | weakly gel-like mass |
| 7 | 10 | 85 ± 4 | steady gel-like mass |
| 8 | 5 | 94 ± 3 | -<<- |
| 9 | 0 | 96 ± 1 | stable gel-like form |
| 10 | −5 | 90 ± 3 | the reaction slows down in time, physical-chemical properties of the final product damage |

Figure 2:
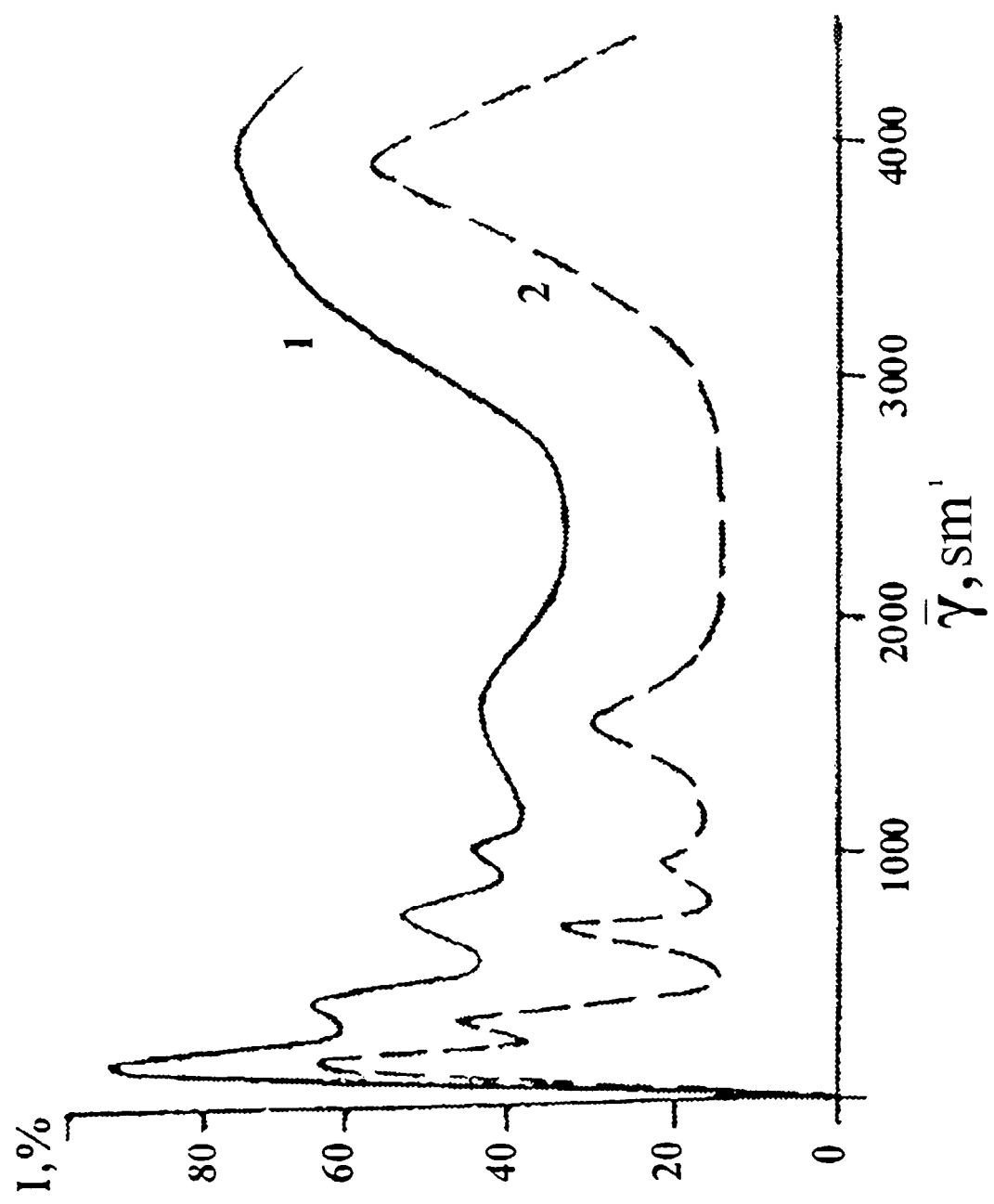
FIG. 2 shows that in the spectrum there is neutron inelastic scattering of hydroxyl groups (absorption at 3500-4000 cm$^{-1}$).

Chemical structure of the achieved compound was proved by its qualitative silicon test, elemental analysis, infrared specters acquired in the area of frequency from 400 to 1400 $cm^{-1}$, which are shown in FIGS. 1 and 2, where valence vibrations of groups Si—O(Si) are noticed.

To calculate models there was used a modern semi-empirical quantum method AM1. In calculations we applied a standard parameterization for all the elements using the software complex CLUSTER-Z1.

Models included cyclic structures (globules), formed at the expense of siloxane ≡Si—O—Si≡ cohesions, as well as hydrogen cohesions ≡Si—OH . . . O—Si≡. In calculations some optimization of the spatial structure of each cluster was operated, its formation heat was evaluated, and using this data, infrared spectrums and neutron inelastic scattering spectrums were calculated, comparing this information with experimental measurements.

To reveal experimentally the global structure of the product matrix, pore solvatation water was removed by heating at 130° C. and their infrared and neutron inelastic scattering spectrums were written down. Infrared spectrums in 400-1400 $cm^{-1}$ frequencies zone were being registered with a spectrophotometer IKS-40 (LOMO), and experimental neutron inelastic scattering spectrum was being fixed with a time-of-flight neutron spectrometer of inverse geometry KDSOG-M.

On FIG. 1 there are shown calculated and experimental infrared spectrums of desiccated hydrogels in 400-1400 $cm^{-1}$ frequencies zone, where valence vibrations of groups Si—O(Si) are registered. In the experimental spectrum there are fixed two very intensive absorption bands at 1030 $cm^{-1}$ and 1150 $cm^{-1}$ instead of one, under the condition that in the compound there are only ≡Si—O—Si≡ cohesions. The fact that in the spectrum there is neutron inelastic scattering (FIG. 2) of hydroxyl groups (absorption at 3500-4000 $cm^{-1}$ indicated the possibility of forming intraglobular cohesions ≡Si—OH . . . O—Si≡ equally with ≡Si—O—Si≡ cohesions. This hypothesis was proved by a practically complete coincidence of calculated and experimental infrared and neutron inelastic scattering spectrums for models of globules which contain siloxane cohesions, as well as intraglobular hydrogen cohesions ≡Si—OH . . . O—Si≡.

Chemical structure of the claimed substance is proved also applying elemental analysis, its results are adduced in Table 4. As follows from the table, the experimental content of water, silicon, carbon and hydrogen in the claimed adsorbent coincides with calculated values of these indices. Hereby, the chemical structure of the claimed adsorbent was proved applying elemental analysis.

TABLE 4

Characteristics of the claimed adsorbent achieved in Examples 1-3

| Product, obtained in Example | Content of elements, mass. %, (calculated/experimental) | | | | Formula | Adsorbing activity, micromole/g |
|---|---|---|---|---|---|---|
| | $H_2O$ | Si | C | H | | |
| 1 | 90.50 | 3.13 | 1.34 | 10.61 | $[(CH_3)_2Si_2O(OH)_4] \cdot 90H_2O$ | 5.4 |
| | 90.51 | 3.15 | 1.32 | 10.62 | | |
| 2 | 91.13 | 2.92 | 1.25 | 10.65 | $[(CH_3)_2Si_2O(OH)_4] \cdot 97H_2O$ | 4.9 |
| | 91.14 | 2.94 | 1.26 | 10.67 | | |

TABLE 4-continued

Characteristics of the claimed adsorbent achieved in Examples 1-3

| Product, obtained in Example | Content of elements, mass. %, (calculated/experimental) | | | | Formula | Adsorbing activity, micromole/g |
|---|---|---|---|---|---|---|
| | $H_2O$ | Si | C | H | | |
| 3 | 92.66 | 3.07 | 1.31 | 10.84 | $[(CH_3)_2Si_2O(OH)_4] \cdot 94H_2O$ | 5.1 |
| | 92.67 | 3.10 | 1.32 | 10.86 | | |

In addition, content of hydroxyl groups bound with silicon atoms, was proved using infrared spectroscopy with an infrared Fourier spectrometer (Bucker, model IFS-113V). For it we used dehydrated samples of the claimed product in liquid petrolatum. According the investigations, in achieved spectrums of all the samples there is a band with wavelength of about 3700 cm$^{-1}$, distinctive for valence vibrations of hydroxyl groups bound with silicon atom. Vibrations of HO-groups bound by hydrogen bonds can be perceived in form of widened band with its maximum in area of 3450-3600 cm$^{-1}$, that is characteristic of bound water molecules.

Thus, it was proved once again that the claimed product contains hydroxyl groups bound with silicon atoms.

Comparative experimental data about the claimed adsorbent and the nearest analog's properties are adduced in Table 5.

TABLE 5

Comparative experimental data about the prototype's properties and the claimed innovative technology.

| No. | Title of compared indices | Index of the prototype | Index of the claimed innovative technology |
|---|---|---|---|
| 1 | Temperature of the final product manufacturing, ° C. | of +10 to +35 | 0 ÷ 5 |
| 2 | Adsorbing activity | No more than 2.5 | 4.9 ± 0.7 |
| 3 | Output of the final product, % | No more than 36.7 | 96 ± 1 |
| 4 | Toxicity of the final product, g/kg | More than 10 | More than 10 |
| 5 | pH | 6.0 | 5.0-7.0 |
| 6 | Correlation of DOMS alkaline solution and $H_2SO_4$ | — | 20:6 |

As we can see from the received data, the claimed product and its production method appreciably differ for the better from its nearest analog. Thus, the output of the final product is almost 2.5 times greater than production of its nearest analog. Increase of the output of the final product is a technical result of the claimed invention.

In connection with the determination of the optimal quantitative correlation of sodium dioximethylsiliconate and strong acid as 20:6 in the synthesis and an efficient temperature of gelatinization (gel maturation) of 0° C. to +5° C., as well as with the detection of new chemical structure of the final product the present invention is a novelty.

There are known prior art methods which achieve limited results, such as using as a feed stock sodium methylsiliconate in its reaction with strong acid, but only the totality of all the adduced characteristics, like using sodium dioximethylsiliconate, treating it with strong acid in correlation 20:6 and providing temperature conditions of 0° C. to +5° C. in the stage of gel maturation, only this complex of properties results in obtaining a new compound with a much higher adsorbing activity and increase its output. Temperature reduction in the stage of gel maturation and definition of optimum correlation (20:6) of sodium dioximethylsiliconate with strong acid achieve the inventive technical solution of the present invention.

In scientific and technical patent literature currently in use, there are submitted inefficient methods of adsorbent manufacturing. The inventors were the first in specifying conditions of synthesis and the optimum correlation of input chemical ingredients. In addition, the adsorbent of the present invention is described using generally accepted physicochemical data, which allows further efficient production and use with certainty.

Public benefit properties of the claimed product consist in its selective adsorbing activity. Thus the inventive substance will be able to satisfy very sufficiently the requirements for use in high-performance adsorbents.

The invention claimed is:

1. An adsorbent, representing the non-linear reaction product of polycondensation, a polyhydrate of 1,1,3,3-tetrahydroxy-1,3-dimethyldisiloxane, having from 88 to 98 moles of water per one mole of 1,1,3,3-tetrahydroxy-1,3-dimethyldisiloxane.

2. A method for producing an adsorbent representing the non-linear reaction product of polycondensation, a polyhydrate of 1,1,3,3-tetrahydroxy-1,3-dimethyldisiloxane, having from 88 to 98 moles of water per one mole of 1,1,3,3-tetrahydroxy-1,3-dimethyldisiloxane, consisting of mixing 19-20 parts of alkaline solution of sodium dioximethylsiliconate (DOMS) with a density of 1.16-1.19 g/cm$^3$ with 6 parts of sulfuric acid with a density of 1.195-1.205 g/cm$^3$ at a temperature of between 0-5° C. followed by aging of the mixture, followed by addition of water, following by mixing, followed by breaking up of the solid product resulting in a suspension, followed by the addition of more water to the suspension, then allowing suspension to settle, followed by removal of the supernatant fluid via decantation, followed by repetition of the settling and decanting steps until DOMS is removed completely, whereupon the final product is washed with a solution of sulphuric acid until water wash has a pH of 4.0, then the final product is washed with purified water until water wash has a pH of 5.0-7.0 followed by drying.

* * * * *